(12) United States Patent
Young et al.

(10) Patent No.: US 9,918,439 B2
(45) Date of Patent: Mar. 20, 2018

(54) APPARATUS AND SYSTEM FOR DELIVERING WATER AND NUTRIENTS TO CROPS, AND METHOD THEREOF

(71) Applicants: Spruce Haven Farm, Union Springs, NY (US); Cuff Farm Services, Auburn, NY (US)

(72) Inventors: Doug Young, Union Springs, NY (US); Stan Cuff, Auburn, NY (US)

(73) Assignees: Spruce Haven Farm, Union Springs, NY (US); Cuff Farm Services, Auburn, NY (US)

(*) Notice: Subject to any disclaimer, the term of this patent is extended or adjusted under 35 U.S.C. 154(b) by 99 days.

(21) Appl. No.: 13/827,448

(22) Filed: Mar. 14, 2013

(65) Prior Publication Data

US 2014/0263698 A1    Sep. 18, 2014

(51) Int. Cl.
*A01G 25/09*    (2006.01)
*A01M 7/00*    (2006.01)

(52) U.S. Cl.
CPC ............. *A01G 25/09* (2013.01); *A01M 7/005* (2013.01)

(58) Field of Classification Search
CPC .................................................. A01G 25/09
USPC .......... 239/99–100, 728–729, 548–549, 565, 239/557–558, 722–723, 734
See application file for complete search history.

(56) References Cited

U.S. PATENT DOCUMENTS

| | | | |
|---|---|---|---|
| 3,550,854 A | 12/1970 | Fischer | |
| 3,643,442 A | 2/1972 | Houston | |
| 3,870,235 A * | 3/1975 | Newell | 239/728 |
| 4,186,881 A | 2/1980 | Long | |
| 4,231,520 A | 11/1980 | Waldrum | |
| 4,592,294 A | 6/1986 | Dietrich, Sr. et al. | |
| 4,735,365 A | 4/1988 | Smeller et al. | |
| 4,763,836 A | 8/1988 | Lyle et al. | |
| 4,970,973 A | 11/1990 | Lyle et al. | |
| 5,755,058 A * | 5/1998 | Guyot | A01B 79/02 111/200 |
| 5,779,163 A * | 7/1998 | Gunter | A01G 25/092 239/728 |
| 5,907,925 A * | 6/1999 | Guyot | A01B 79/005 210/602 |
| 6,343,749 B1 | 2/2002 | Thom | |
| 7,150,419 B1 * | 12/2006 | Tomlonovic et al. | 239/722 |
| 7,823,807 B1 * | 11/2010 | Bauer | 239/688 |
| 2007/0234941 A1 * | 10/2007 | McLeod | A01C 23/008 111/121 |
| 2011/0127344 A1 * | 6/2011 | Korus et al. | 239/1 |

OTHER PUBLICATIONS

International Search Report and Written Opinion for corresponding International Patent Application No. PCT/US14/25684 (dated Aug. 5, 2014).

* cited by examiner

*Primary Examiner* — Arthur O Hall
*Assistant Examiner* — Tuongminh Pham
(74) *Attorney, Agent, or Firm* — LeClairRyan, a Professional Corporation

(57) ABSTRACT

The present invention relates to an apparatus for delivering water and nutrients to crops. The present invention also relates to a system comprising the apparatus of the present invention connected to a hose traveler device. Also disclosed is a method of delivering water and nutrients to the soil using the system of the present invention.

31 Claims, 14 Drawing Sheets

APPARATUS AND SYSTEM FOR DELIVERING WATER AND NUTRIENTS TO CROPS, AND METHOD THEREOF

FIELD OF THE INVENTION

This invention relates to an apparatus and system for delivering water and nutrients to crops, and to a method of delivering water and nutrients to soil.

BACKGROUND OF THE INVENTION

Historically, fertilizing field crops has involved distributing livestock waste, particularly in solid form, onto the surface of soil by a manure spreader using a flail to fling the material to the rear. A more modern side-discharge spreader also deposits solid livestock waste on the surface of the soil.

The advent of confinement systems for animals which include pits below the confinement area produces a large amount of animal waste in a slurry form. This slurry must be handled and disposed of in an environmentally acceptable manner. Typically, the slurry is pumped into a large tank carried by a wagon or mounted on a truck.

One use of this slurry is to spread it or spray it onto the surface of the soil. While this process delivers to the soil advantageous nutrients, it has, as a principle objection, a strong odor which remains after the waste is spread. In addition, spraying slurry onto growing crops presents the problem of coating vegetation with slurry, which can be harmful to growing plants. Moreover, surface spreading of animal waste can be problematic in terms of potential runoff of nitrates and phosphorus into rivers and streams. This is objectionable because livestock waste is high in nitrogen, and swine waste is also high in phosphorus.

To avoid these problems, various methods have been proposed for depositing animal waste slurry underground near growing crops. One method uses a fertilizer knife, such as that illustrated in U.S. Pat. No. 4,592,294 to Dietrich et al. The slurry is delivered behind the knife. However, this leaves a very narrow band of fertilizer having a high concentration of nitrogen and other nutrients.

Another method of subsoil delivery of animal waste employs a standard chisel plow shank with an attached wide cultivator sweep in an attempt to distribute the slurry further laterally and to avoid the limitations associated with a narrow concentration of nutrients. This method, however, presents the problem of a trailing slurry hose that can damage growing crops. The damage caused by the trailing hose, dispensed from the reel carrier, especially when a turn is made, makes it impractical for use at key stages of nutrient consumption in growing crop plants.

Veenhuis B. V. of Raalte (The Netherlands) makes and distributes a full line of slurry dispensing systems, including a slurry reel system. This system utilizes a trailing hose slurry injector. An advantage to a trailing hose injector is its ability to smoothly apply slurry in or onto the soil. The slurry is supplied through the hose, rather than dragged across the land. However, the limitations of this system include a slurry injector that is low to the ground, which provides only limited clearance to growing plants, especially taller plants such as maize. Thus, it is not possible to distribute nutrients to a growing crop once it has reached a certain height using these systems. In addition, the systems require the transport of a large tank (containing the slurry) over the soil causing severe soil compaction.

The present invention is directed to overcoming these and other limitations in the art by providing an apparatus and system for delivering water and nutrients to growing crops without causing structural damage to growing plants and by reducing soil compaction.

SUMMARY OF THE INVENTION

One aspect of the present invention relates to an apparatus for delivering water and nutrients to crops. The apparatus includes a traveling tower structure; a substantially horizontal span structure, where the span structure is supported by the traveling tower structure; a supply conduit connected to the traveling tower structure and connectable to a fluid delivery conduit of a hose traveler device, where the supply conduit is capable of receiving water and nutrients from the fluid delivery conduit of the hose traveler device; a manifold connected to the supply conduit to receive the water and nutrients from the supply conduit, said manifold comprising a plurality of fluid exit ports; and a plurality of drop tubes comprising first ends and second ends, said first ends being connectable to the fluid exit ports of the manifold to receive the water and nutrients from the manifold, wherein the plurality of drop tubes are suspended along and from the substantially horizontal span structure so that the second ends are separately positionable at or near the ground to dispense the water and nutrients.

A second aspect of the present invention relates to a system comprising the apparatus of the present invention and a hose traveler device, where the apparatus is connected to the hose traveler device to receive water and nutrients from the hose traveler device.

A third aspect of the present invention relates to a method of delivering water and nutrients to soil. This method involves providing the system of the present invention; positioning the apparatus of the system at a distance from the hose traveler device; supplying water and nutrients to the apparatus from the hose traveler device to deliver the water and nutrients to the soil via the plurality of drop tubes; and retracting the fluid delivery conduit of the hose traveler device to pull the apparatus toward the hose traveler device along said soil to deliver the water and nutrients to the soil.

The present invention has the advantage in that it provides agricultural equipment and methods for delivering nutrients to the soil near growing plants without causing severe soil compaction because there is no need to transport large volumes of fluid in a tank through a growing crop field. The agricultural equipment and method of the present invention offer the ability to optimize crop growth by being able to deliver water and nutrients at the best time—i.e., during certain growing stages of plant development without causing damage to the growing plants. This advantage is achieved with an apparatus that has a high clearance and is configured to operate in field rows, without crossing rows and damaging plants. Another important advantage of the present invention is the ability to drop nutrients on the ground and avoid contacting crop leaves and stems directly with nutrients, which can cause plant damage.

These and other advantages are achieved through the apparatus, system, and method of the present invention.

DETAILED DESCRIPTION OF THE INVENTION

The present invention relates to agricultural equipment for delivering water and nutrients to field crops, and a method of its use.

Figure 1:
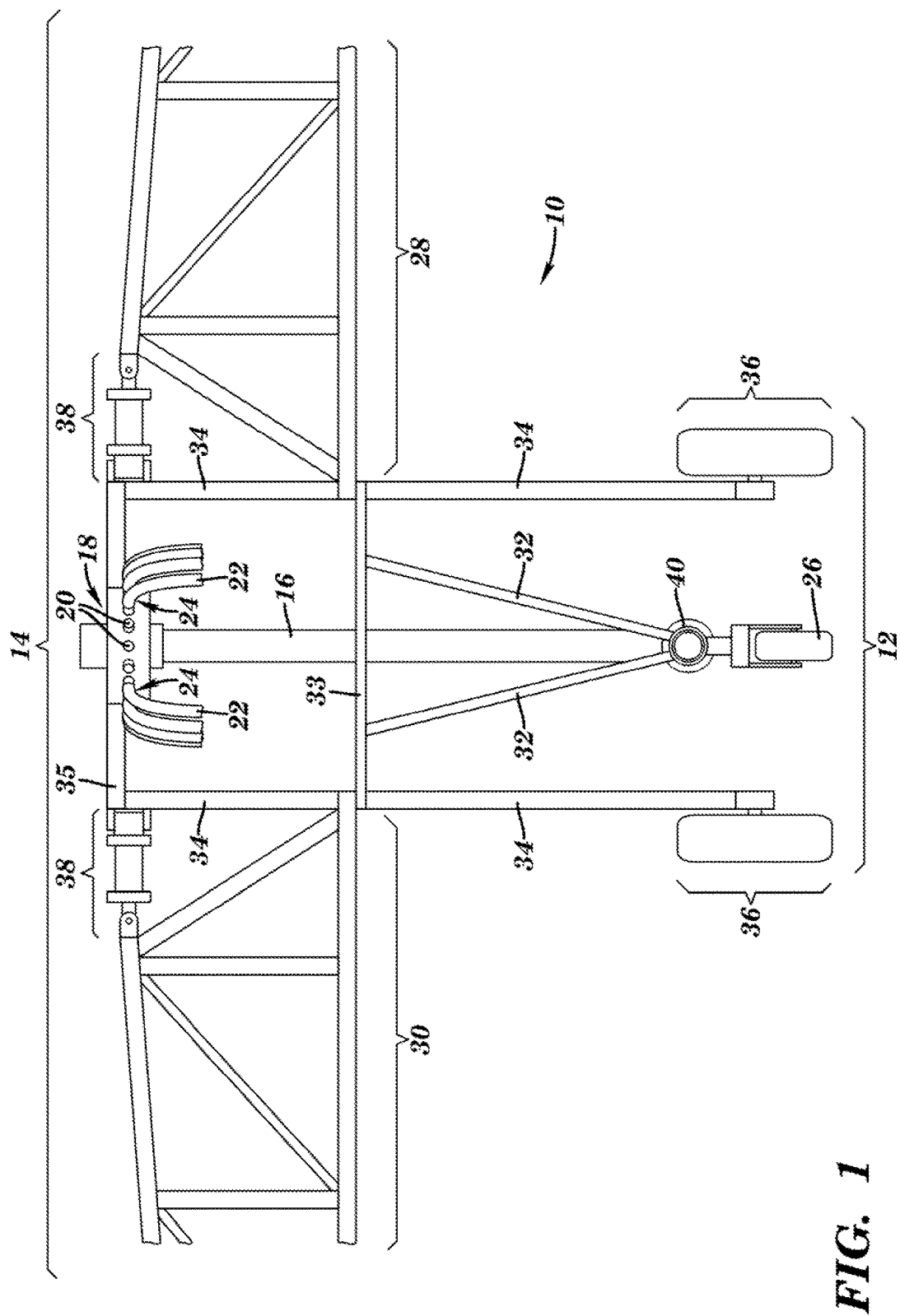
FIG. 1 is a front view of an apparatus for delivering water and nutrients to crops according to one embodiment of the present invention. The apparatus includes a traveling tower structure, a substantially horizontal span structure which is supported by the traveling tower structure, a manifold, and a plurality of drop tubes.
Figure 2:
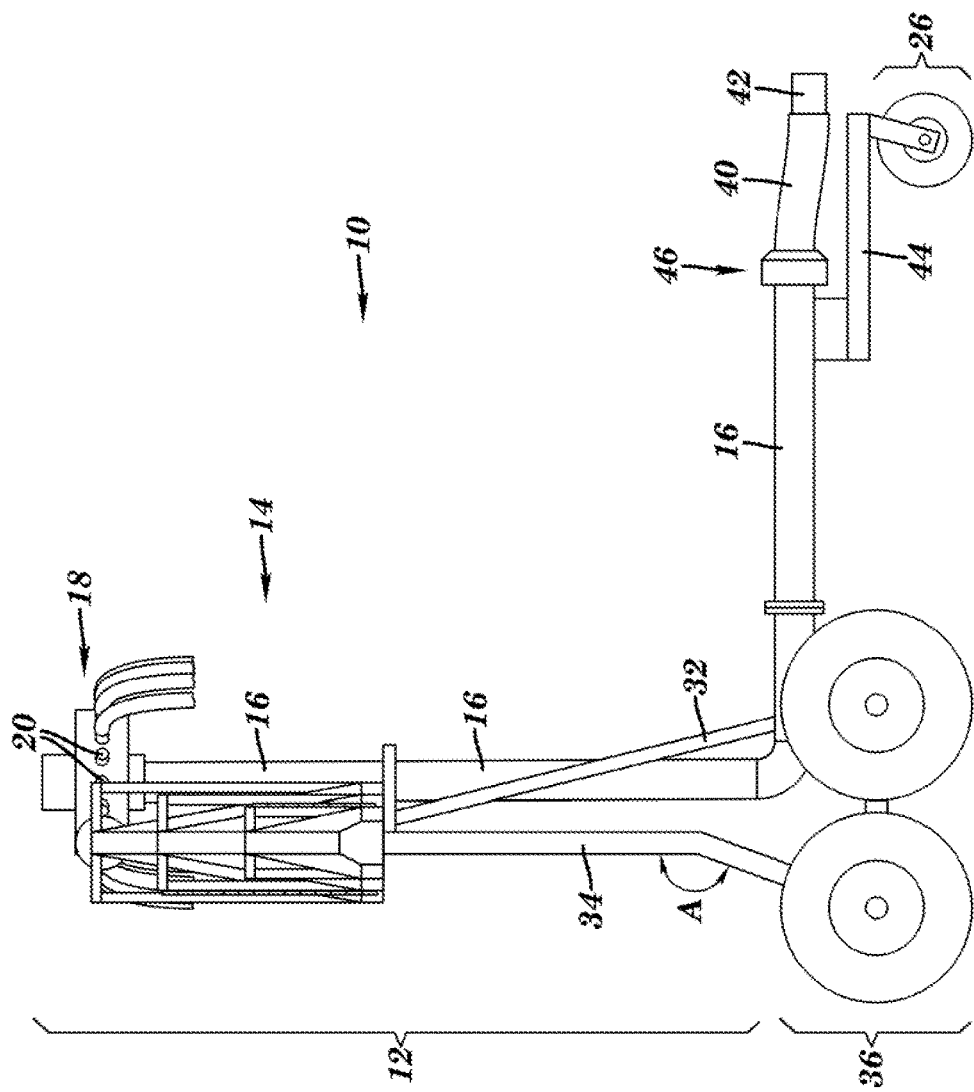
FIG. 2 is a side view of the apparatus shown in FIG. 1.

One aspect of the present invention relates to an apparatus for delivering water and nutrients to crops. Referring to FIGS. 1-2, apparatus 10 for delivering water and nutrients to crops includes traveling tower structure 12 and substantially horizontal span structure 14 supported by traveling tower structure 12. Connected to traveling tower structure 12 is supply conduit 16. Manifold 18 is connected to supply conduit 16.

Traveling tower structure 12 and horizontal span structure 14 are constructed of any durable material including, without limitation, metal (e.g., steel and/or aluminum) or other materials that can provide structural framework to apparatus 10. In one embodiment, horizontal span structure 14 is constructed of aluminum material, which provides good structural integrity but is lightweight.

As shown in the particular embodiment illustrated in FIGS. 1-2, manifold 18 is connected to traveling tower structure 12 and is in an elevated positioned on tower structure 12, although manifold 18 may be positioned anywhere on or proximate traveling tower structure 12. In one embodiment, and as illustrated in FIGS. 1-2, manifold 18 is cylindrical in shape, although other geometries may be used.

Manifold 18 contains a plurality of fluid exit ports 20. In the particular embodiment illustrated in FIGS. 1-2, the plurality of fluid exit ports 20 are arranged in evenly spaced positions around the cylindrical wall of manifold 18. A plurality of drop tubes 22 are connected individually to a fluid exit port 20 at a first end 24. In one embodiment, drop tubes are connected at each and every fluid exit port 20 of manifold 18.

Drop tubes 22 are, according to one embodiment, constructed of a flexible material, or are constructed in a way that makes them flexible so that they can bend. Drop tubes 22 may vary in length from a few feet to several dozen feet. The diameter of drop tubes 22 may vary from a few centimeters to several inches.

In the particular embodiment illustrated in FIGS. 1-2, substantially horizontal span structure 14 is supported in its middle section by traveling tower structure 12. Specifically, substantially horizontal span structure 14 is constructed of two lateral projection wings 28 and 30 extending from opposing sides of traveling tower structure 12. Lateral projection wings 28 and 30 provide structural framework for drop tubes 22.

In one embodiment, drop tubes 22 are connected at first ends 24 to fluid exit ports 20 and then travel along horizontal span structure 14 to a particular designated location where they are then suspended to a location at or near the ground below the particular designated location on horizontal span structure 14. Thus, drop tubes 22 may be of different lengths depending on how far they are to extend along horizontal span structure 14.

Horizontal span structure 14 may be equipped with clamps or hangers to support the length of drop tubes 22 along horizontal span structure 14. This is particularly important when water and nutrients is running through drop tubes 22 to support the weight of the fluid and nutrients in the drop tubes Traveling tower structure 12 is, according to one embodiment, supported by wheels to facilitate easy movement of apparatus 10. In the embodiment illustrated in FIGS. 1-2, pairs of wheels 36 are connected to opposing frames 34, which are spaced apart at an appropriate distance so that each of the pair of wheels 36 will reside in a row between planted crops in a field. Horizontal frames 33 and 35 connect to opposing frames 34 to provide structural support to traveling tower structure 12. In one embodiment, manifold 18 is connected to horizontal frame 35. Other geometries of traveling tower structure 12 may be used besides what is illustrated in FIGS. 1-2. However, traveling tower structure 12 will typically have wheels that are suited to travel in a row between crops, and a clearance that permits travel through a crop field without causing structural damage to growing plants.

In one embodiment, traveling tower structure 12 has a height sufficient to support substantially horizontal span structure 14 at a height sufficient to clear growing crops, e.g., corn, wheat, soybean, alfalfa, cotton, tobacco, etc., as it travels through a field. In one embodiment, substantially horizontal span structure 14 is at least about 2 feet, 2½ feet, 3 feet, 3½ feet, 4 feet, 4½ feet, 5 feet, 5½ feet, 6 feet, 6½ feet, or more off the ground at its lowest point.

As illustrated in FIGS. 1-2, a center wheel 26 is positioned between and out in front of the pairs of wheels 36 to provide support for supply conduit 16. The position of center wheel 26 relative to pairs of wheels 36 is illustrated in the side view of apparatus 10 in FIG. 2.

In one embodiment, center wheel 26 is smaller than pairs of wheels 36, although this is not a requirement. In addition, center wheel 26 may pivot to provide directional movement to apparatus 10. The pivot feature of center wheel 26 ensures that apparatus 10 travels in the direction of the hose traveler.

Supply conduit 16 is shown to extend from manifold 18 down traveling tower structure 12 near the ground to rest on support frame 44 and center wheel 26. As shown in FIGS. 1-2, supply conduit 16 is supported by traveling tower structure 12 at support beams 32 which connect supply conduit 16 to opposing frames 34. Other structural geometries may be used.

As illustrated in FIG. 2, supply conduit 16 is terminated by flexible hose 40 at connection site 46. At the end opposite connection site 46 of supply conduit 16 is hose traveler connector 42 by which supply conduit 16 may be connected to a hose traveler device. Frame 44 is connected to supply conduit 16 and center wheel 26 to help provide structural support for flexible hose 40. In one embodiment, flexible hose 40 is constructed of a durable rubber material, although other materials may be used.

To assist in reducing stress at connection points with traveling tower structure 12, shock absorbers 38 are provided at opposing sides of traveling tower structure 12. One suitable type of shock absorber is an air cylinder shock absorber. As illustrated in FIG. 1, lateral projection wings 28 and 30 of substantially horizontal span structure 14 is constructed in a light-weight support frame to enable the furthest possible extension of lateral projection wings 28 and 30 to provide the widest possible horizontal wingspan for apparatus 10. A wide wingspan places stress on the framework of traveling tower structure 12 and horizontal span structure 14, particularly as apparatus 10 travels through a field. Shock absorbers 38 are intended to provide structural support for a wide wing span.

In one embodiment, shock absorbers 38 are used to raise or lower wings 28 and 30 to navigate around obstacles in a field.

Figure 3:
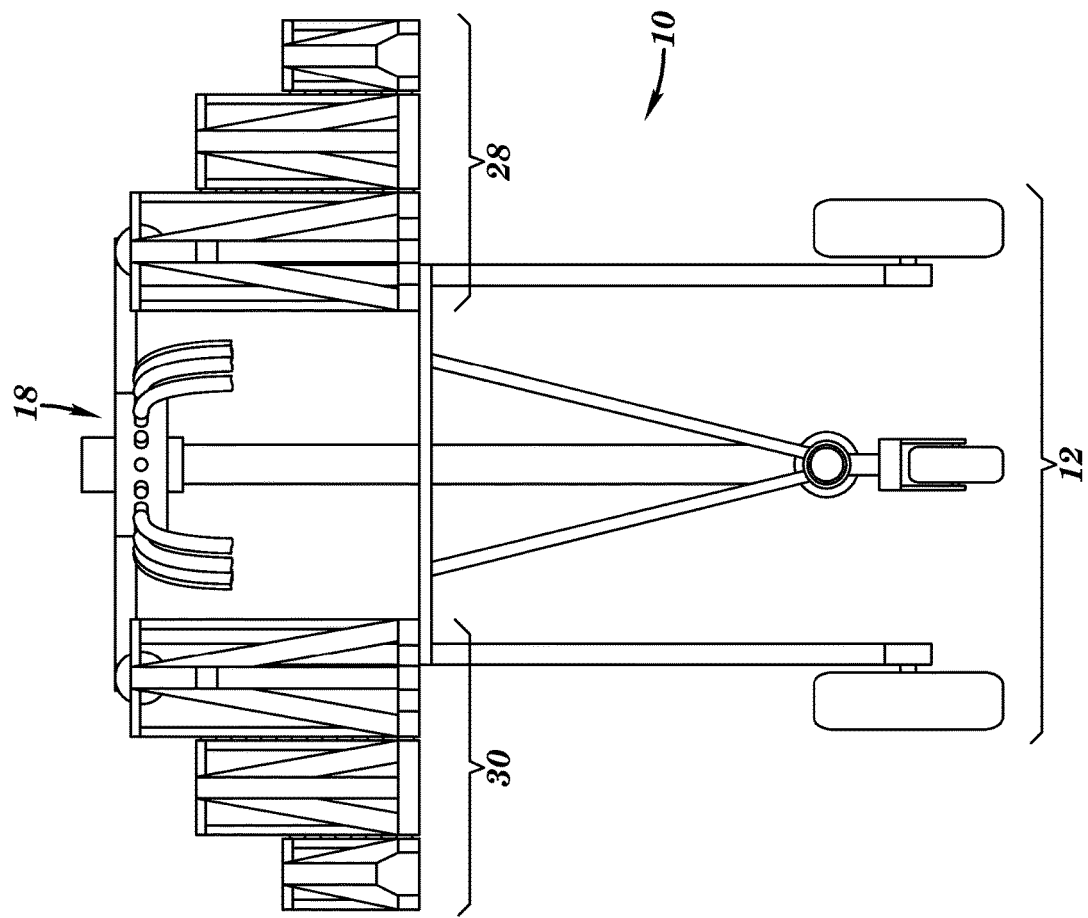
FIG. 3 is a front view of an apparatus for delivering water and nutrients to crops according to one embodiment of the present invention. The substantially horizontal span structure is folded in towards the traveling tower structure to facilitate transport of the apparatus to/from a field site or to minimize storage space.

As illustrated in FIG. 3, the frame used to form lateral projection wings 28 and 30 may be constructed in a way to permit folding in of lateral projection wings 28 and 30. This makes transport of apparatus 10 from one location to another (e.g., from one field crop to another) much more practical. It also makes for more compact storage.

In one embodiment, horizontal span structure 14 may possess support beams that extend to the ground to provide structural support to wings 28 and 30 when apparatus 10 is not in use.

Figure 4:
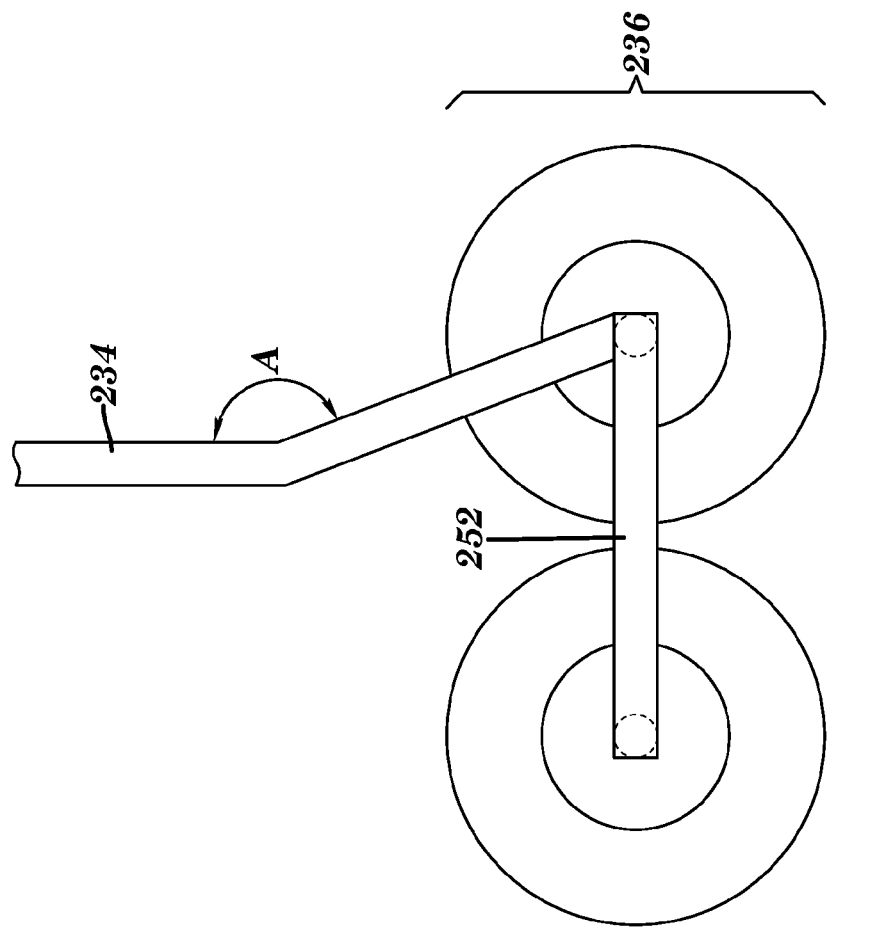
FIG. 4 is a side view of one embodiment of a set of wheels used to support the traveling tower structure. The rear wheel is connected to an angled support frame to reduce load on the front wheel.

FIG. 4 illustrates one embodiment of a particular structure of frame 234 supporting pair of wheels 236 which provide the traveling capability of the traveling tower structure of the apparatus of the present invention. Specifically, frame 234 has angle A which angles toward the rear wheel of pair of wheels 236. Horizontal wheel beam 252 connects the forward wheel of pair of wheels 236 to the trailing wheel. Angle A in frame 234 places more weight burden on the trailing wheel, and permits the forward wheel to easily climb over rocks, stones, or other obstacles during forward movement.

Figure 5:
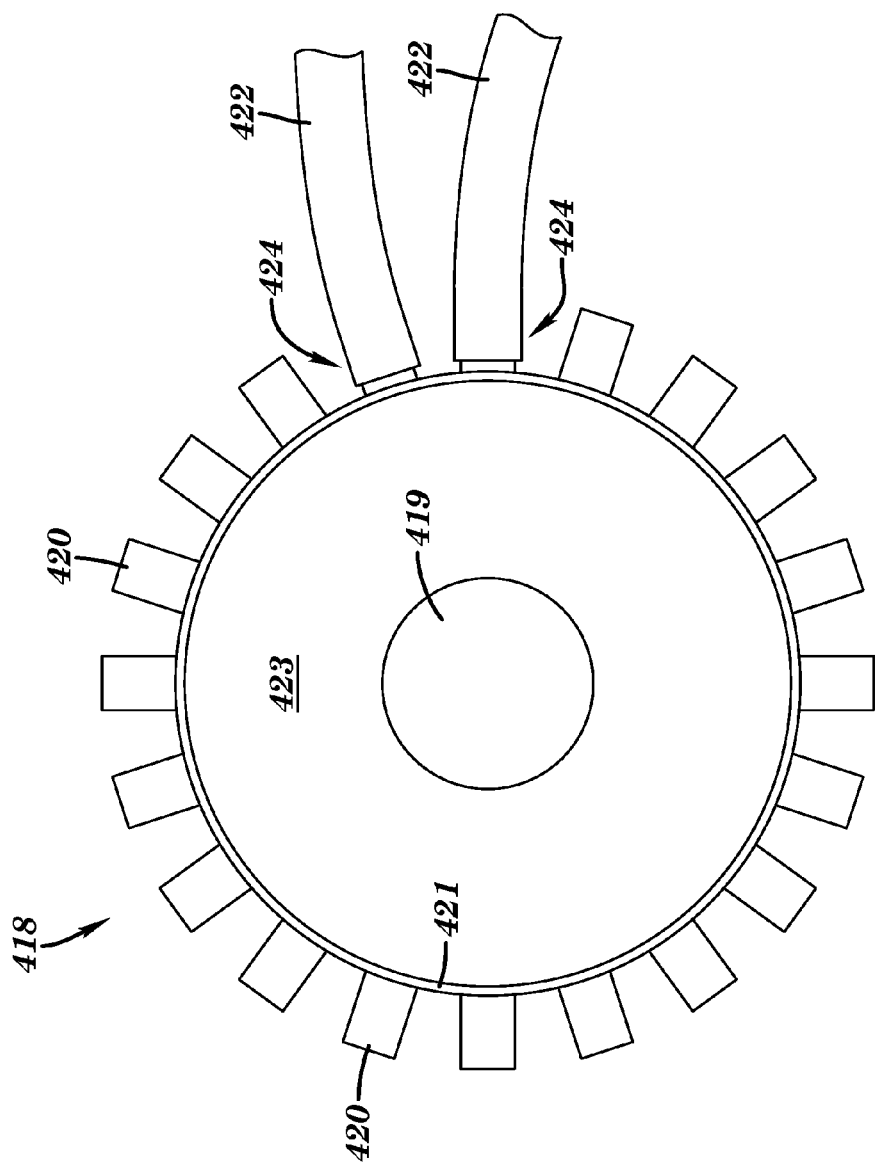
FIG. 5 is a top view of one embodiment of a manifold included on the apparatus of the present invention. Two drop tubes are shown connected at two different fluid exit ports of the manifold, but the manifold is capable of receiving drop tubes at every fluid exit port.
Figure 6:
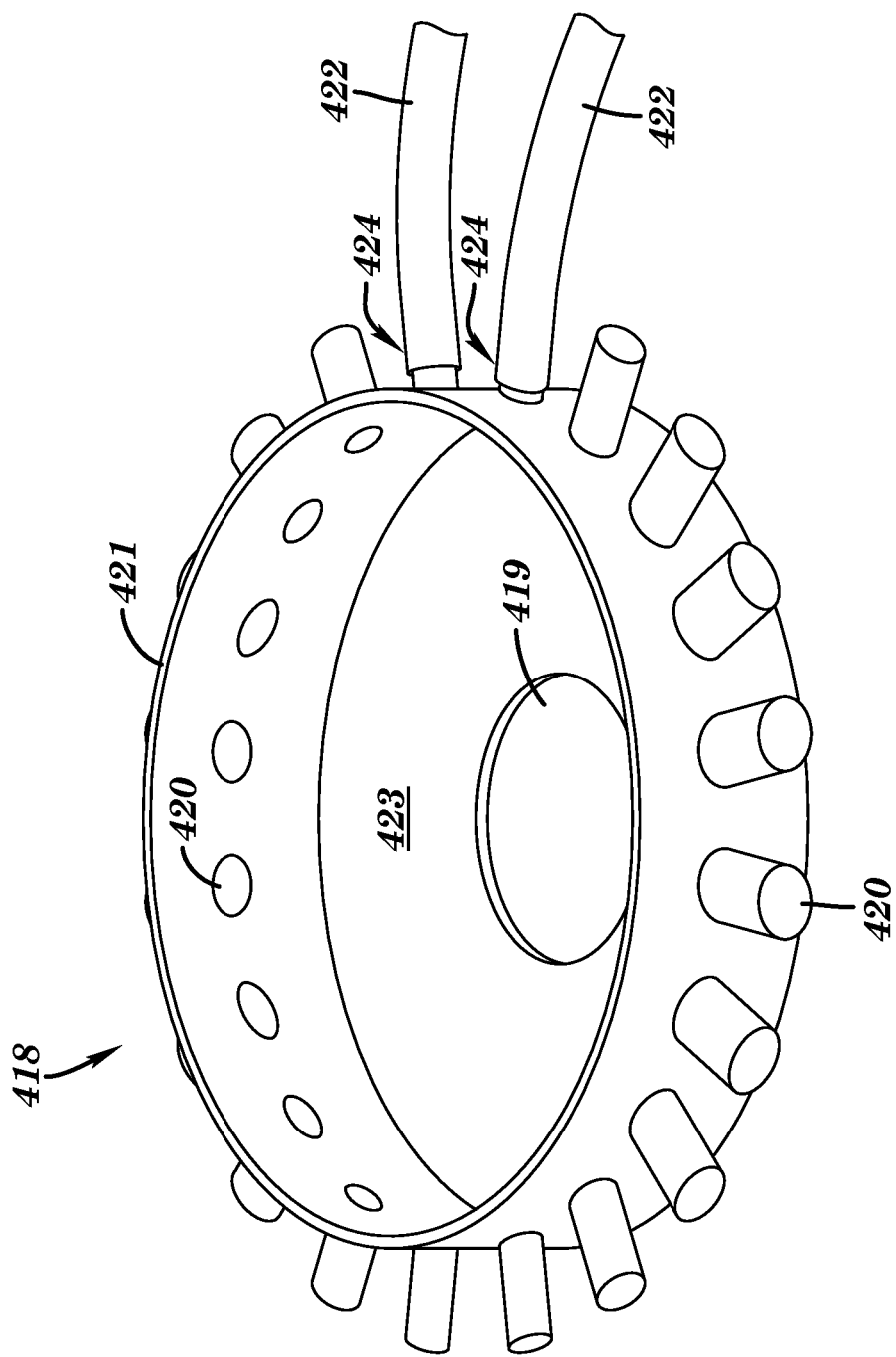
FIG. 6 is a perspective view of the manifold shown in FIG. 5.

FIGS. 5 and 6 show one embodiment of the manifold of the apparatus of the present invention. Specifically, manifold 418 has side wall or frame 421 and bottom surface 423. In the embodiment illustrated in FIGS. 6 and 7, manifold 418 is in the shape of a cylinder. Side wall 421 contains a plurality of fluid exit ports 420 evenly positioned around the circumference of side wall 421. Two drop tubes 422 are shown to be connected to separate fluid exit ports 420 at first ends 424 of drop tubes 422. Manifold 418 has center hole 419 by which manifold 418 is connected to a supply conduit as described herein.

Figure 7:
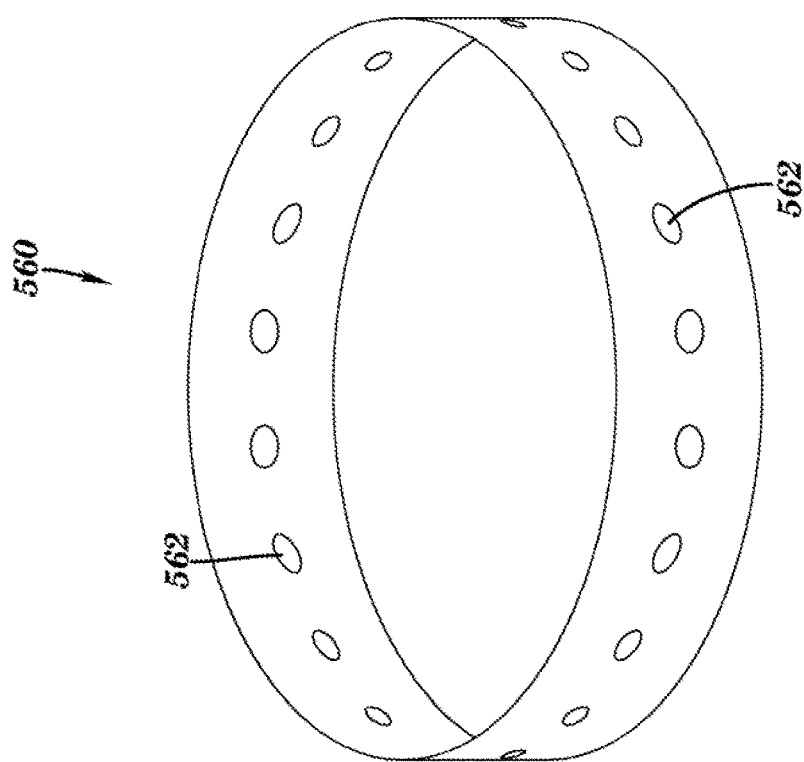
FIG. 7 is a perspective view of one embodiment of an insert sleeve used to adjust the size of hole in the fluid exit ports of the manifold.

FIG. 7 illustrates insert sleeve 560 which may be positioned inside of manifold 418 against the interior of wall or frame 421. Insert sleeve 560 has a plurality of holes 562 that match evenly positioned fluid exit ports in the manifold. Insert sleeve 560 is replaceable and various dimensions of holes 562 may be used to modify the amount of fluid that passes through the exit ports of the manifold.

Figure 8:
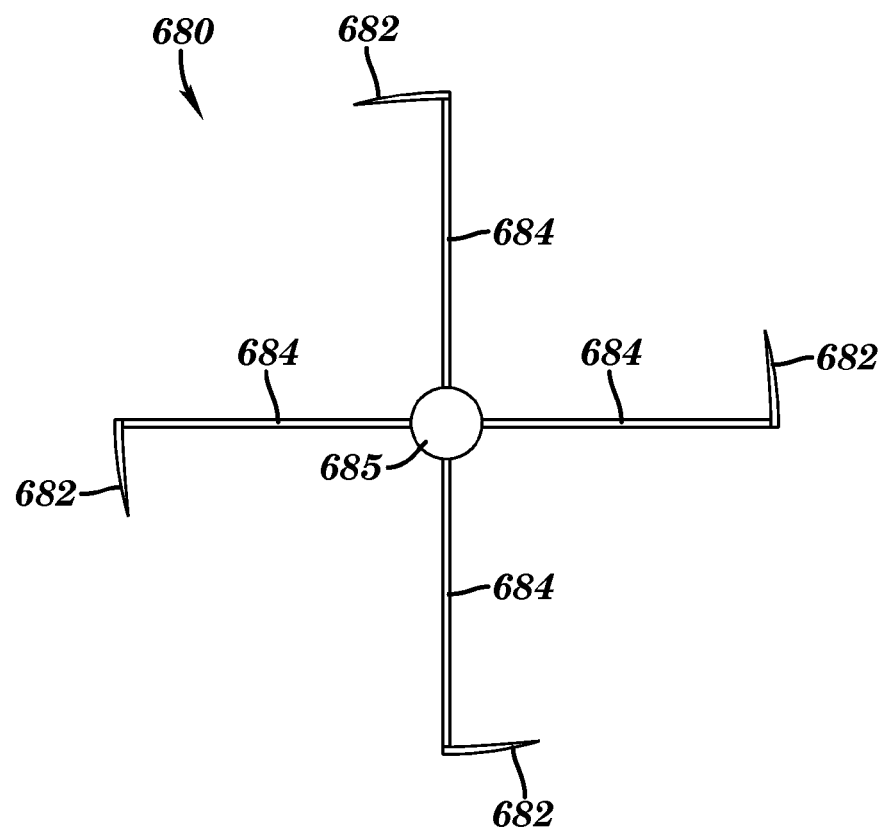
FIG. 8 is a top view of one embodiment of a removable distributor device with four arms, each of which is terminated with a blade.
Figure 9:
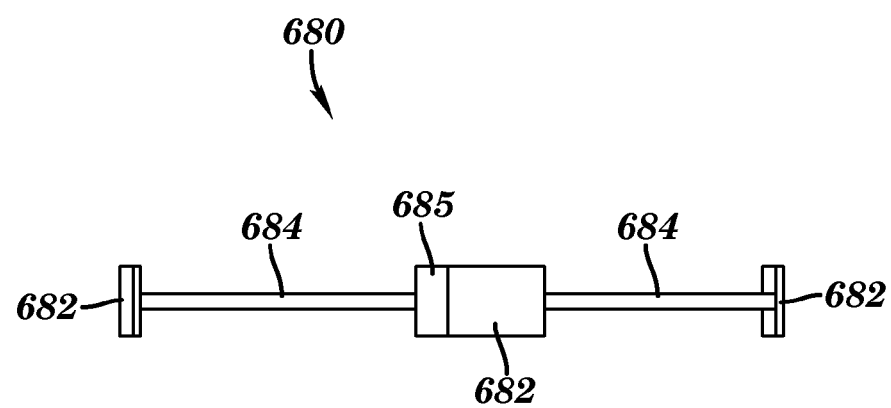
FIG. 9 is a front view of the removable distributor device according to FIG. 8.
Figure 10:
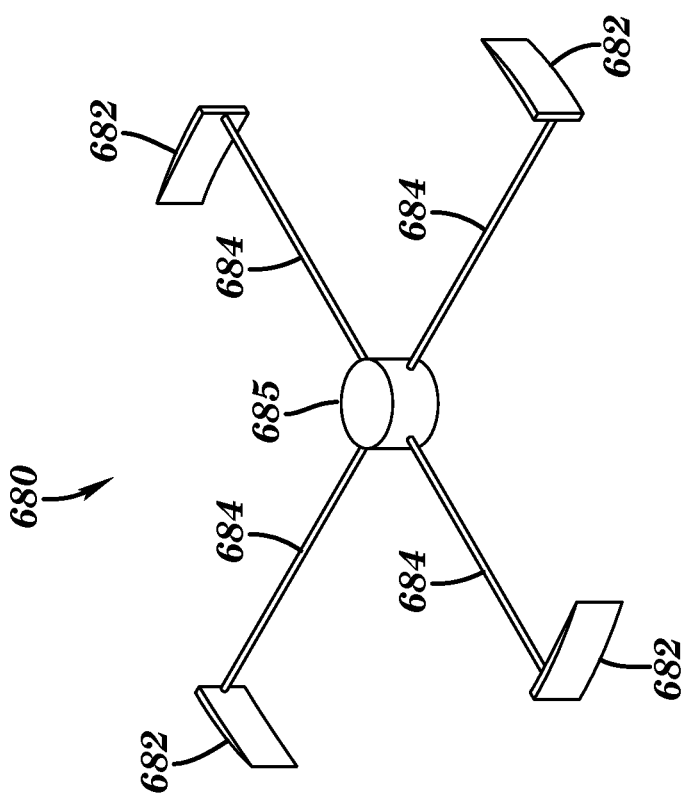
FIG. 10 is a perspective view of the removable distributor device according to FIG. 8.

Another part of the manifold is removable distribution device 680, which is illustrated in FIG. 8. Distribution device 680 includes a plurality of arms 684 emanating from central structure 685. In the embodiment illustrated in FIG. 8 there are four arms, although other numbers may be used. Each of arms 684 is connected to a blade 682. Removable distribution device 680 is further illustrated in the front view and perspective view of FIGS. 9 and 10, respectively.

Figure 11:
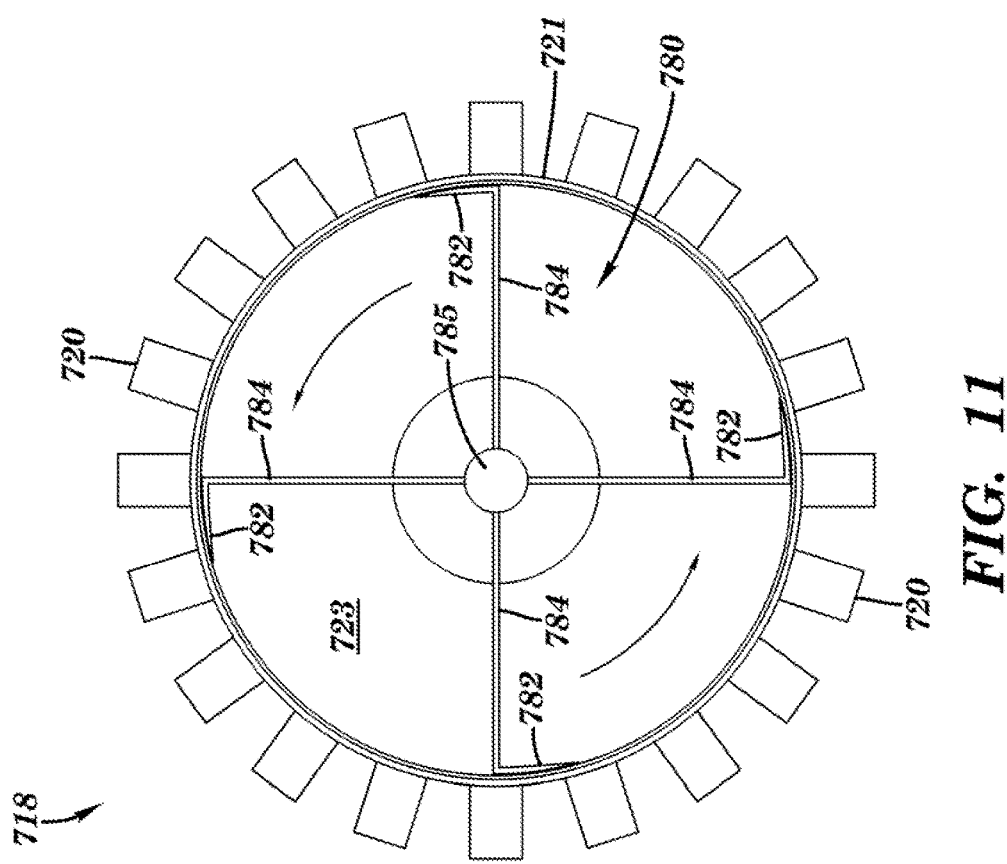
FIG. 11 is a top view of one embodiment of a manifold containing the removable distributor device according to FIG. 8.
Figure 12:
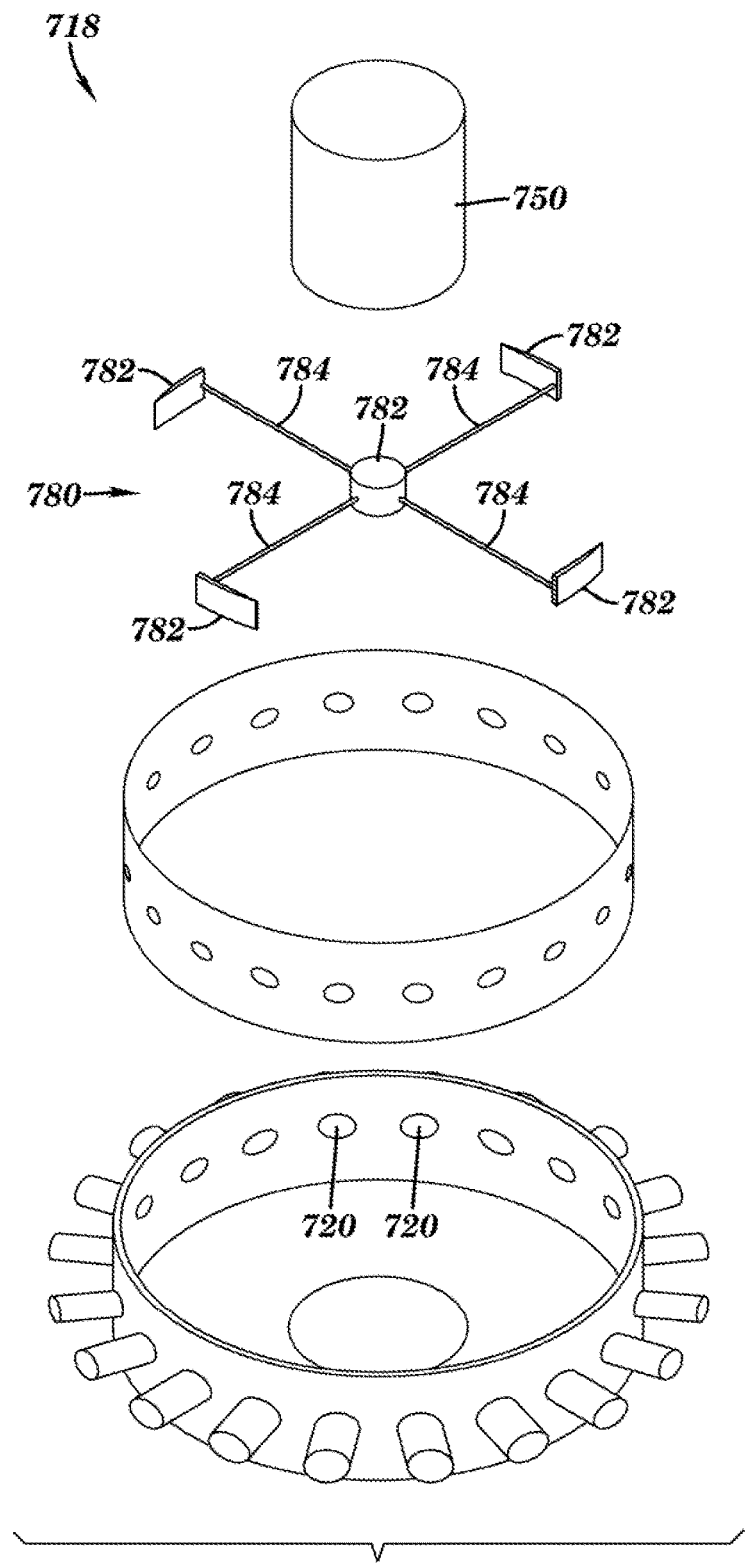
FIG. 12 is an exploded, perspective view of one embodiment of the manifold and its parts as shown in FIG. 11. The parts include the manifold wall or frame, an insert sleeve, a removable distributor device, and a motor to rotate the distributor device.

A top view of an assembled manifold is illustrated in FIG. 11, which includes manifold 718 having side wall or frame 721, bottom surface 723, and evenly spaced fluid exit ports 720. Set inside of manifold 718 is removable distribution device 780, which includes arms 784 emanating from central structure 785 and terminating in blades 782. As illustrated, blades 782 are of a particular structure so that at any one time during rotation along side wall 721 a number of exit ports 720 are covered by blades 782 so as to prevent the flow of fluid into the drop tubes. This can help ensure more even flow through the drop tubes and prevent any build-up of material inside the manifold at the exit ports. An exploded, perspective view of manifold 718 is illustrated in FIG. 12, which includes motor 750 to rotate removable distribution device 780.

Figure 13:
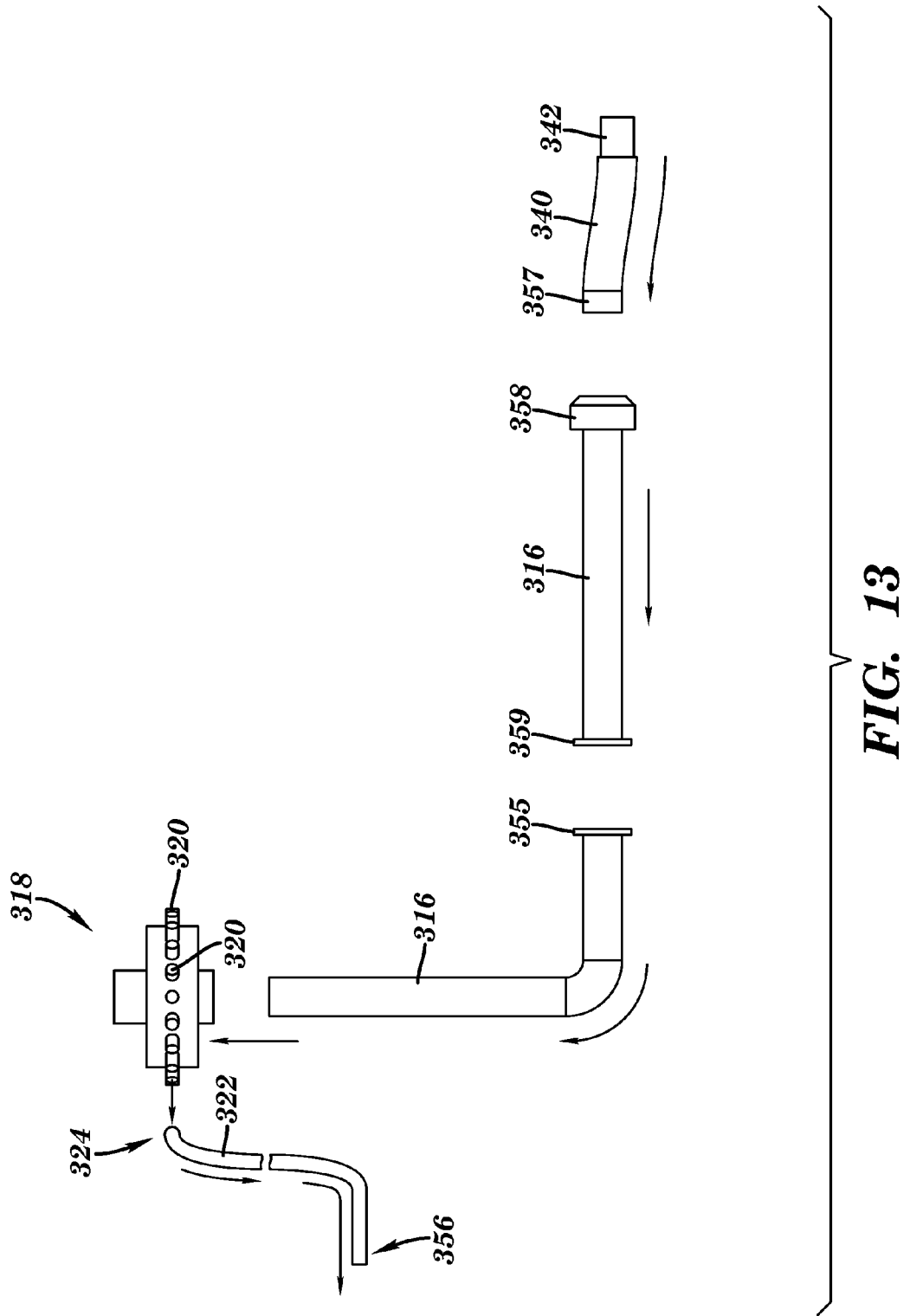
FIG. 13 is an exploded, side view of one embodiment of a supply conduit and its connection to the manifold. Arrows are included to show the directional flow of water and nutrients from a hose traveler device through the apparatus to the soil.

In operation, the apparatus of the present invention is used to deliver water and/or nutrients to crops. The apparatus is essentially a distribution device, and does not require a fluid tank or the hauling of large quantities of water and nutrients through a crop field. The fluid pathways of the apparatus are illustrated in an exploded parts view in FIG. 13. Water and/or nutrients are received by the apparatus at hose traveler connector 342 on the terminal end of flexible hose 340. Flexible hose 340 has connector 357 to connect to supply conduit 316 at connector 358. Supply conduit 316 may be segmented, for example, as illustrated in FIG. 13. Segmented parts may be connected by typical tube or plumbing connection joints, such as joint connectors 359 and 355 shown. Manifold 318 is connected to supply conduit 316 to receive fluid as it flows into flexible hose 340 and through supply conduit 316. Fluid then is distributed to the plurality of drop tubes 322 connected at ends 324 to fluid exit ports 320. Fluid (i.e., water/nutrients) then flows out of ends 356 of drop tubes 322 onto the soil.

Another aspect of the present invention relates to a system comprising the apparatus of the present invention at a hose traveler device, where the apparatus is connected to the hose traveler device to receive water and nutrients from the hose traveler device.

Figure 14:
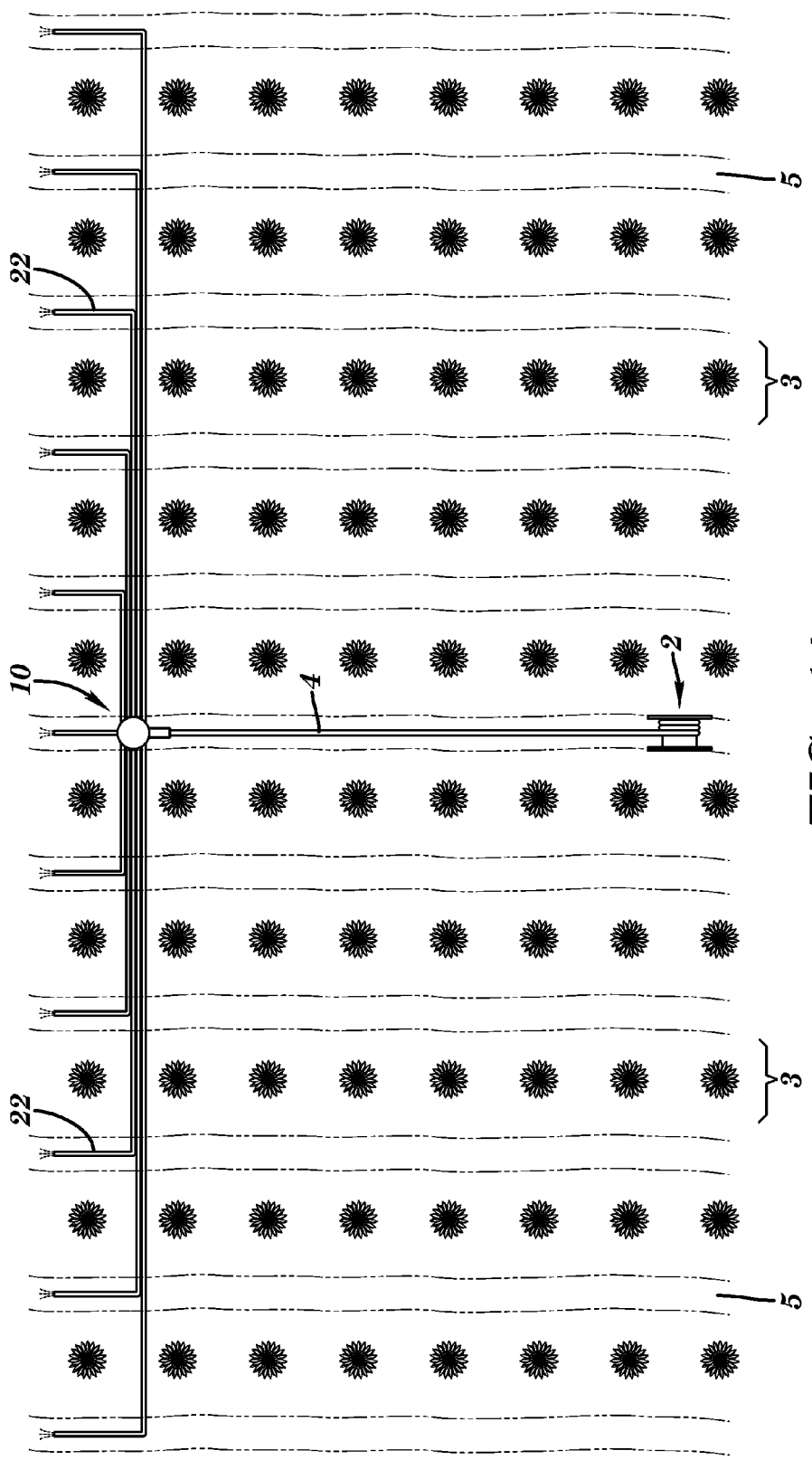
FIG. 14 is a plan view of an agricultural field in which one embodiment of the system of the present invention is operating. In particular, the apparatus of the present invention is positioned in a field and connected to a hose traveler device which supplies water and nutrients and pulls the apparatus in as water and nutrients are deposited from the plurality of drop tubes.
Figure 15:
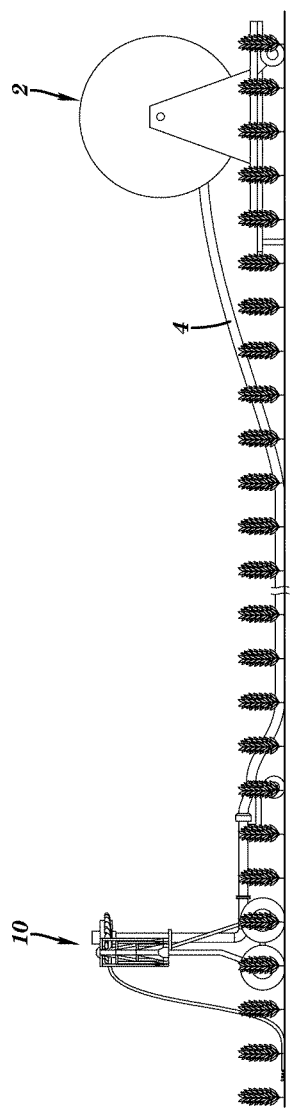
FIG. 15 is a side view of the system shown in FIG. 14 in an agricultural field.

One embodiment of the system of the present invention is illustrated in FIGS. 14 and 15, which show apparatus 10 connected by fluid delivery conduit 4 to hose traveler device 2, which supplies apparatus 10 with water and nutrients to be distributed through the drop tubes of apparatus 10 onto the soil.

As illustrated in FIG. 14, apparatus 10 travels toward hose traveler device 2 without damaging rows of crops 3. This is accomplished as wheels of apparatus 10 and hose 4 are positioned in spaces 5 between rows of crops 3. Drop tubes 22 are shown to distribute water and nutrients to rows of crops 3 at spaces 5.

Hose traveler devices are known by persons of ordinary skill in the art and are commercially available from, e.g., Cadman (Courtland, Ontario, Canada). In one embodiment, the hose traveler device delivers about 250-450, about 275-425, about 300-400, about 325-375, or about 350 gallons per minute of fluid to the apparatus of the present invention.

Another aspect of the present invention is directed to a method of delivering water and nutrients to soil. This method involves providing the system according to the present invention and positioning the apparatus at a distance from the hose traveler device. Nutrients are supplied to the apparatus from the hard traveler device to deliver the nutrients to the soil via the plurality of drop tubes. The fluid delivery conduit of the hose traveler device is retracted to pull the apparatus toward the hose traveler device along said soil to deliver the nutrients to the soil.

In one embodiment, the method of the present invention is carried out to deliver water and/or nutrients to growing row crops.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An apparatus for delivering animal waste slurry to crops, said apparatus comprising:
   a traveling tower structure comprising a frame and ground support to support the frame for movement across the ground, wherein the traveling tower structure is incapable of self-propulsion;
   a substantially horizontal span structure comprising a middle section and two lateral projection wings extending from two opposing sides, wherein the span structure is supported by the traveling tower structure;
   a supply conduit connected to the traveling tower structure and connectable to a fluid delivery conduit of a hose traveler device at a hose traveler connector, wherein the supply conduit is capable of receiving animal waste slurry from the fluid delivery conduit of the hose traveler device, and wherein the traveling tower structure, when connected to the fluid delivery conduit, carries or supports the fluid delivery conduit of the hose traveler device only at the hose traveler connector;
   a manifold connected to the supply conduit to receive the animal waste slurry from the supply conduit, said manifold comprising a plurality of fluid exit ports; and
   a plurality of drop tubes comprising first ends and second ends, said first ends being connectable to the fluid exit ports of the manifold to receive the animal waste slurry from the manifold, wherein the plurality of drop tubes are suspended in a horizontal direction along the substantially horizontal span structure and hang freely in a vertical direction from the substantially horizontal span structure so that the second end rest on the ground and drag along the ground in use to dispense the animal waste slurry.

2. The apparatus according to claim 1, wherein the supply conduit is positioned forward of the traveling tower structure and is supported in weight by a pivotable wheel.

3. The apparatus according to claim 2, wherein the supply conduit is flexible.

4. The apparatus according to claim 1, wherein the traveling tower structure has a ground clearance of about 2 feet to about 6½ feet.

5. The apparatus according to claim 1, wherein said ground support comprises wheels.

6. The apparatus according to claim 1 further comprising:
   a shock absorber positioned on either side of the traveling tower and connecting the traveling tower structure to the substantially horizontal span structure.

7. The apparatus according to claim 1, wherein the manifold comprises an intake port by which the manifold is connected to the supply conduit.

8. The apparatus according to claim 1, wherein the manifold is in the form of a cylinder.

9. The apparatus according to claim 8, wherein said plurality of exit ports are aligned along a single plane around a wall of the cylinder.

10. The apparatus according to claim 9, wherein the manifold comprises a removable distributor device that rotates in a single direction inside the manifold to provide uniform distribution of animal waste slurry among the plurality of drop tubes.

11. A system comprising:
    the apparatus according to claim 1 and
    a hose traveler device, wherein the apparatus is connected to the hose traveler device to receive animal waste slurry from the hose traveler device.

12. The system according to claim 11, wherein the supply conduit is positioned forward of the traveling tower structure and is supported in weight by a wheel.

13. The system according to claim 12, wherein the supply conduit is flexible.

14. The system according to claim 13, wherein the wheel is pivotable.

15. The system according to claim 11, wherein said ground support comprises wheels.

16. The system according to claim 11 further comprising:
    a shock absorber positioned on either side of the traveling tower and connecting the traveling tower structure to the substantially horizontal span structure.

17. The system according to claim 11, wherein the manifold comprises a single intake port by which the manifold is connected to the supply conduit.

18. The system according to claim 11, wherein the manifold is in the form of a cylinder.

19. The system according to claim 18, wherein said plurality of exit ports are aligned along a single plane around a wall of the cylinder.

20. The system according to claim 19, wherein the manifold comprises a removable distributor device that rotates in a single direction inside the manifold to provide uniform distribution of animal waste slurry among the plurality of drop tubes.

21. A method of delivering animal waste slurry to soil, said method comprising:
    providing the system according to claim 11;

positioning the apparatus at a distance from the hose traveler device;

supplying animal waste slurry to the apparatus from the hose traveler device to deliver the animal waste slurry to soil via the plurality of drop tubes; and retracting the fluid delivery conduit of the hose traveler device to pull the apparatus toward the hose traveler device along said soil to deliver the animal waste slurry to the soil.

22. The method according to claim 21, wherein said method is carried out to deliver the animal waste slurry to growing row crops.

23. The method according to claim 21, wherein the supply conduit is positioned forward of the traveling tower structure and is supported in weight by a wheel.

24. The method according to claim 23, wherein the supply conduit is flexible.

25. The method according to claim 24, wherein the wheel is pivotable.

26. The method according to claim 21, wherein said ground support comprises wheels.

27. The method according to claim 21 further comprising: a shock absorber positioned on either side of the traveling tower and connecting the traveling tower structure to the substantially horizontal span structure.

28. The method according to claim 21, wherein the manifold comprises a single intake port by which the manifold is connected to the supply conduit.

29. The method according to claim 21, wherein the manifold is in the form of a cylinder.

30. The method according to claim 29, wherein said plurality of exit ports are aligned along a single plane around the circular cylinder wall.

31. The method according to claim 30, wherein the manifold comprises a removable distributor device that rotates in a single direction inside the manifold to provide uniform distribution of animal waste slurry among the plurality of drop tubes.

* * * * *